United States Patent

Kizior

[11] 4,116,809
[45] Sep. 26, 1978

[54] DEAERATOR CIRCUIT FOR BITUMEN FROTH

[75] Inventor: Thaddeus Eugene Kizior, Edmonton, Canada

[73] Assignees: Her Majesty the Queen in right of Canada, as represented by the Minister of Energy, Mines and Resources, Ottawa; Her Majesty the Queen in right of the Province of Alberta, Government of the Province of Alberta, Department of Energy and Natural Resources, Alberta Syncrude Equity, Edmonton; Ontario Energy Corporation; Imperial Oil Limited, both of Toronto; Canada-Cities Service, Ltd., Calgary; Gulf Oil Canada Limited, Toronto, all of Canada

[21] Appl. No.: 746,669

[22] Filed: Dec. 2, 1976

[30] Foreign Application Priority Data

Apr. 27, 1976 [CA] Canada .................................. 251187

[51] Int. Cl.² ............................................. C10G 1/04

[52] U.S. Cl. .............................................. 208/11 LE
[58] Field of Search ................ 208/11 LE; 196/14.52

[56] References Cited

U.S. PATENT DOCUMENTS 3,052,621  9/1962  Clark .............................. 208/11 LE
3,998,702  12/1976  Opukn ............................ 208/11 LE

FOREIGN PATENT DOCUMENTS 630,710  11/1961  Canada ............................... 208/11 LE Primary Examiner—Herbert Levine
Attorney, Agent, or Firm—E. P. Johnson

[57] ABSTRACT

Bitumen froth streams from the primary separation vessel and secondary flotation cells are gravity transferred into one or more columns and heated and deaerated therein by passing them countercurrent to steam. The heated deaerated froth is then pumped with centrifugal pump means to the froth treatment circuit. By deaerating and heating before pumping, the froth is converted from a form difficult to pump to one which is relatively easy to pump.

1 Claim, 1 Drawing Figure

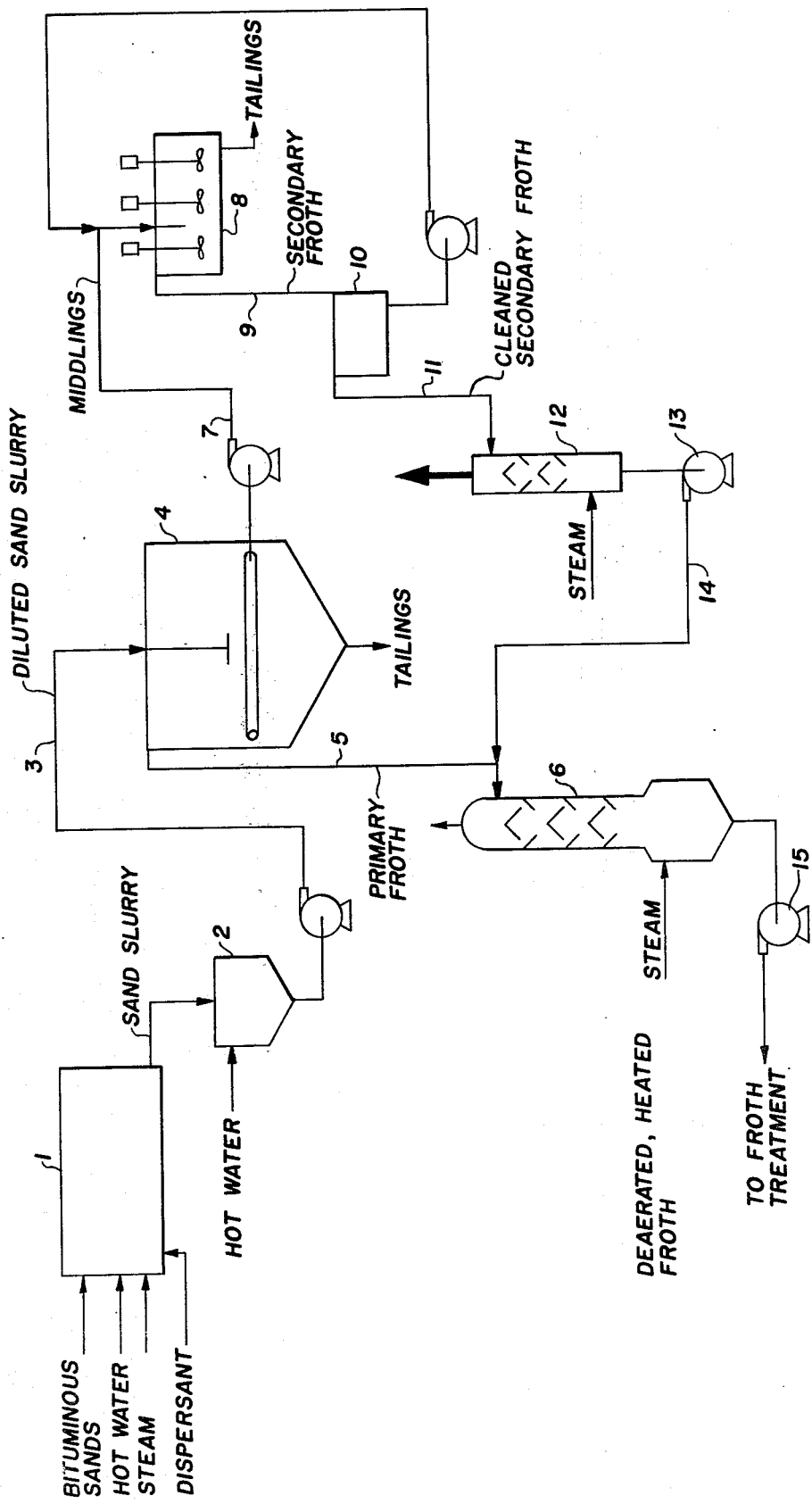

DEAERATOR CIRCUIT FOR BITUMEN FROTH

BACKGROUND OF THE INVENTION

This invention relates to a method for treating the primary and secondary bitumen froth streams produced from bituminous sands by a hot water extraction process plant. More particularly, it relates to a system for heating and deaerating bitumen froth prior to introducing it into a system for recovery of the bitumen from the deaerated stream.

One of the world's largest reserves of hydrocarbons is contained in the tar sands deposits located in Northern Alberta. Bitumen is presently being recovered from this tar sand using the known hot water extraction process.

In general terms, this process involves mixing tar sand with water, steam and sodium hydroxide in a rotating tumbler to initially disperse the bitumen. A typical slurry issuing from the tumbler comprises 9.5% bitumen, 68.5% solids and 22.0% water (all percents being by weight). The slurry has a temperature of about 180° F and a pH of 8.0–9.5. Hot water is added to the slurry to dilute it and provide a stream typically containing 7% bitumen, 50% solids and 43% water. This diluted slurry is then introduced into a cylindrical vessel having a conical bottom. The bulk of the contained coarse sand particles settles out in this vessel and is removed as an underflow and discarded. The more buoyant bitumen particles float to the surface of the vessel to form a froth comprised of bitumen plus entrapped water and solids. This froth overflows the vessel wall and is received in a launder extending around its rim. The product is commonly called "primary froth" and typically comprises 66.4% bitumen, 8.9% solids and 24.7% water. It is usually at a temperature of about 175° F. A middlings stream, typically comprising 2.3% bitumen, 21% fine solids (i.e. −325 mesh) and 76.8% water, is withdrawn from the mid-section of the settler and is pumped to a sub-aeration flotation cell. In the cell, the middlings are vigorously agitated and aerated. The middlings bitumen and some water and solids float to the surface and form "secondary froth." This froth typically compresses 41.4% bitumen, 12.4% solids and 46.2% water. It is recovered in a launder and is then retained in a tank to settle out some water and solids. The settled product typically comprises 41.4% bitumen, 12.4% solids and 46.2% water and has a temperature of 170° F. Heretofore the primary froth and settled secondary froth have been combined and pumped to a heating and deaerating column. In this column the viscosity of the bitumen is reduced from about 1500 centipoise at 160° F. to about 500 centipoise at 190° F. The hot deaerated product is then diluted with naphtha and introduced into a centrifuging system to recover clean dilute bitumen.

SUMMARY OF THE INVENTION

We have discovered that secondary froth in particular is difficult to pump with centrifugal pumps, due to its viscosity and the high degree of aeration by which it is characterized. When a tar sand containing a high proportion of fine solids is fed to the tumbler, more water has to be used, with the result that more middlings have to be withdrawn. In this circumstance, more secondary froth is produced and the combined froth stream is difficult to pump.

In accordance with the present invention, the primary and secondary froth streams are directly fed by gravity to one or more deaerator columns wherein the streams are heated and deaerated with steam to produce a pumpable mixture of bitumen, water and solids. This mixture is then pumped with one or more centifugal pumps to the froth treatment circuit.

In a preferred embodiment, the secondary froth is passed through a first deaerator column in which it is heated and deaerated. The primary froth is passed through a second deaerator column. When the first deaerator column is operating inefficiently due to heavy loading, its product can be combined with the primary froth prior to the latter's entry into the second column, with the result that the secondary froth is heated and deaerated twice.

Certain advantages are derived from the practice of the invention. By deaerating the secondary froth before pumping, a head of hot deaerated froth is supplied to the suction of the centrifugal pump. Because it has been heated, the froth is considerably less viscous and the fluid hydraulics of the transfer system are improved. Because it has been deaerated, the froth is more incompressible and hence is more amenable to centrifugal pumping.

DESCRIPTION OF THE DRAWING

The FIGURE shows an embodiment of the invention incorporated into a conventional extraction circuit.

DESCRIPTION OF THE PREFERRED EMBODIMENT

With reference to the drawing, bituminous sands, hot water, steam and dispersant are fed to a rotating tumbler 1 to produce a thick slurry. The slurry is transferred to a flood cell 2 where it is diluted with hot water. It is then pumped through a line 3 to the primary separation vessel 4. Here primary froth is produced and gravity transferred through the line 5 to a first shed tray tower 6 for deaeration and heating. Steam is introduced into the base of the tower 6 to pass counter-currently to the froth. A middlings stream is withdrawn from the mid-section of the vessel 4 and is pumped through the line 7 to a sub-aerated flotation cell 8. Here the bitumen contained in the middlings is floated to form secondary froth which is gravity transferred through the line 9 to a froth cleaner 10. Solids and water are settled out of the secondary froth in the cleaner 10 and the cleaned froth is gravity transferred through the line 11 into a second shed tower 12 where it is deaerated and heated by steam passing countercurrently. The deaerated and heated secondary froth from the tower 12 is easily pumped by a centrifugal pump 13 through the line 14 to the first tower 6, where the secondary froth is given a second deaerating and heating treatment. The combined froths issuing from the tower 6 are easily pumped by a centrifugal pump 15 to froth treatment facilities.

In summary, the invention is based on the observation that centrifugal pumps have difficulty in pumping bitumen froth which has not been heated and deaerated; as a result, a process has been developed whereby the froth has been transferred by gravity drainage to deaerating and heating towers before being pumped with centrifugal pumps.

The embodiments of the invention in which an exclusive property or privilege is claimed are defined as follows:

1. In the hot water extraction process for treating tar sand wherein primary and secondary froth streams are produced by a primary separation vessel and a secondary flotation cell, said streams comprising mixtures of bitumen, water and solids, and the streams are transferred to a froth treatment circuit for recovering the bitumen, the improvement which comprises:

directly feeding the secondary froth stream by gravity from a secondary flotation cell to a first deaerator tower and heating and deaerating said stream by passing it countercurrently to steam through said tower;

conveying the deaerated secondary froth stream to a second deaerator tower;

directly feeding the primary froth stream by gravity from a primary separation vessel to the second deaerator tower;

passing said streams countercurrently to steam through said second tower to heat and deaerate them to provide a pumpable deaerated bitumen, water and solids product; and pumping the product with one or more centrifugal pumps to the froth treatment circuit.

* * * * *